(12) United States Patent
Throop et al.

(10) Patent No.: US 10,706,642 B2
(45) Date of Patent: Jul. 7, 2020

(54) EFFICIENT TELEMATICS DATA UPLOAD

(71) Applicant: Ford Global Technologies, LLC, Dearborn, MI (US)

(72) Inventors: Medville Jay Throop, Ann Arbor, MI (US); Praveen Kumar Yalavarty, Novi, MI (US); Douglas B. Thornburg, Dearborn, MI (US); John William Schmotzer, Canton, MI (US); Brian David Tillman, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 687 days.

(21) Appl. No.: 14/864,229

(22) Filed: Sep. 24, 2015

(65) Prior Publication Data

US 2017/0092018 A1 Mar. 30, 2017

(51) Int. Cl.
  *G07C 5/00* (2006.01)
  *G07C 5/08* (2006.01)
  *H04L 29/08* (2006.01)

(52) U.S. Cl.
  CPC .......... *G07C 5/008* (2013.01); *G07C 5/0816* (2013.01); *H04L 67/12* (2013.01)

(58) Field of Classification Search
  None
  See application file for complete search history.

(56) References Cited

U.S. PATENT DOCUMENTS

| 6,181,994 B1* | 1/2001 | Colson | G07C 5/008 701/31.5 |
| 6,434,458 B1* | 8/2002 | Laguer-Diaz | B61L 3/125 701/31.4 |
| 7,493,198 B2* | 2/2009 | Sonnenrein | B60R 16/02 340/438 |
| 7,707,606 B2* | 4/2010 | Hofrichter | H04L 12/2805 725/133 |
| 8,406,988 B2* | 3/2013 | Schafer | G08G 1/0104 340/908 |

(Continued)

FOREIGN PATENT DOCUMENTS

| CN | 102546741 A | 7/2012 |
| WO | 2011017812 A1 | 2/2011 |
| WO | 2011050703 A1 | 5/2011 |

*Primary Examiner* — Abby Y Lin
*Assistant Examiner* — Edward Torchinsky
(74) *Attorney, Agent, or Firm* — Frank Lollo; Brooks Kushman P.C.

(57) ABSTRACT

A system includes at least one processor configured to, in response to receiving a VIN from a remote vehicle, transmit to the vehicle a parameter definition selected based on fields of the VIN to configure an ECU of the vehicle to enter a logging mode to capture, aggregate, and send operational data of the vehicle, and a bandwidth configuration file for a modem of the vehicle based on historical throughput requirements associated with operational data. The parameter definition may include a reporting application configured to be executed by a processor of the ECU to generate a processed parameter from a raw parameter associated with vehicle operation. Also, the parameter definition may include updated firmware for the ECU, and the reporting application is configured to be executed by the ECU after the updated firmware is installed in the ECU.

6 Claims, 7 Drawing Sheets

(56) References Cited

U.S. PATENT DOCUMENTS

| | | | |
|---|---|---|---|
| 8,924,071 B2* | 12/2014 | Stanek | G07C 5/0816 |
| | | | 701/31.4 |
| 9,292,334 B2* | 3/2016 | Preston | B60R 25/00 |
| 9,451,028 B2* | 9/2016 | Rude | H04L 67/12 |
| 2005/0080606 A1 | 4/2005 | Ampunan et al. | |
| 2007/0112785 A1 | 5/2007 | Murphy et al. | |
| 2008/0077315 A1 | 3/2008 | Yao | |
| 2014/0371977 A1 | 12/2014 | Sumi et al. | |
| 2015/0349977 A1* | 12/2015 | Risse | G08G 1/20 |
| | | | 701/36 |
| 2016/0203652 A1* | 7/2016 | Throop | G07C 5/008 |
| | | | 701/36 |

* cited by examiner

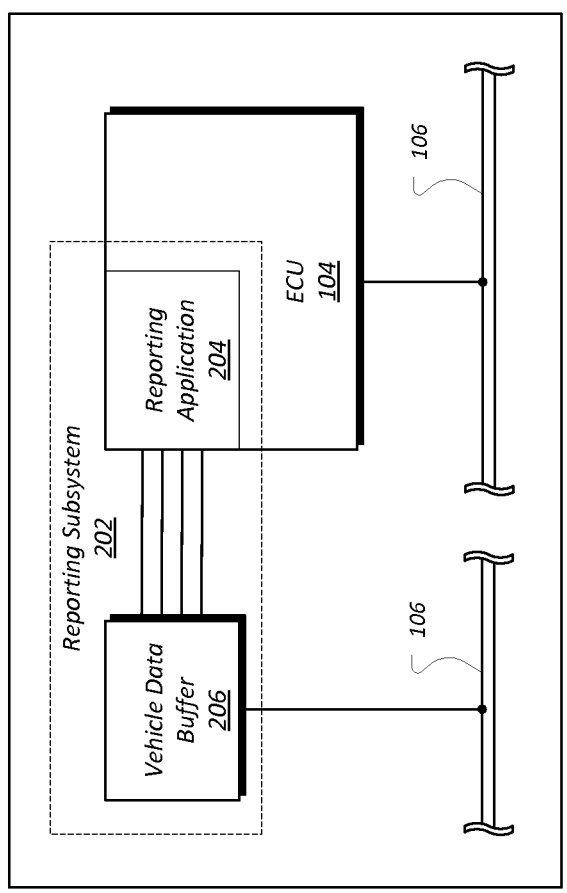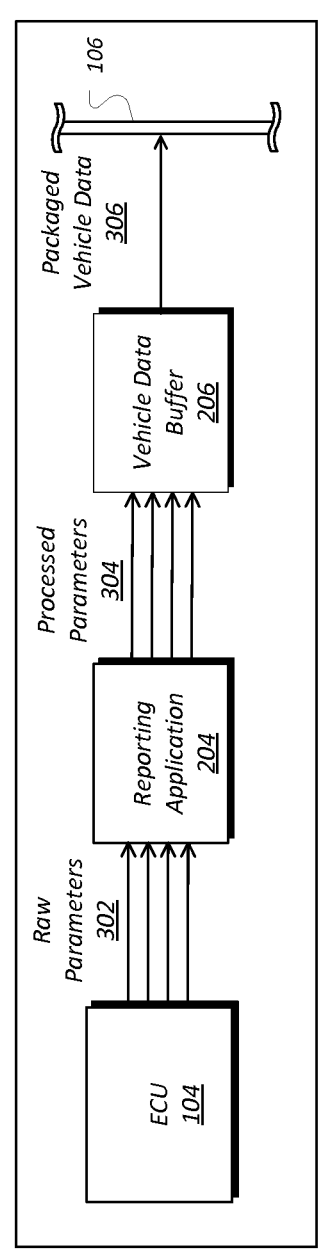

EFFICIENT TELEMATICS DATA UPLOAD

TECHNICAL FIELD

Aspects of this disclosure generally relate to a method and apparatus for the efficient providing of telematics data from vehicles.

BACKGROUND

Vehicle telematics units may be utilized to allow a user of a vehicle to interact with services available over a communications network. These services may include turn-by-turn directions, telephone communications, vehicle monitoring, and roadside assistance. In some vehicles, telematics features may be used to provide vehicle diagnostic and other data to a remote cloud server, but with limited data content and reporting intervals.

SUMMARY

A system includes at least one processor configured to, in response to receiving a VIN from a remote vehicle, transmit to the vehicle a parameter definition selected based on fields of the VIN to configure an ECU of the vehicle to enter a logging mode to capture, aggregate, and send operational data of the vehicle, and a bandwidth configuration file for a modem of the vehicle based on historical throughput requirements associated with operational data.

A system includes at least one processor configured to, in response to receiving a VIN from a vehicle, transmit to the vehicle a parameter definition selected based on the VIN and a connection bandwidth with an ECU in the vehicle, wherein the parameter definition configures the ECU to enter a logging mode to capture, aggregate, and send operational data of the vehicle.

A computer-implemented method includes a remote server. The remote server generates a parameter definition based on available bandwidth between the remote server and an electronic control unit (ECU) in a vehicle. The remote server sends to the vehicle the parameter definition of a processed parameter to be computed by the ECU. The remote server receives the processed parameter from a vehicle data buffer associated with the ECU.

BRIEF DESCRIPTION OF THE DRAWINGS

FIG. 2 illustrates an example diagram of a reporting subsystem of the system for one of the electronic control units of the vehicle;

FIG. 3 illustrates an example diagram of processing of vehicle data by a reporting application for a reporting subsystem of the vehicle electronic control units;

DETAILED DESCRIPTION

Figure 1:
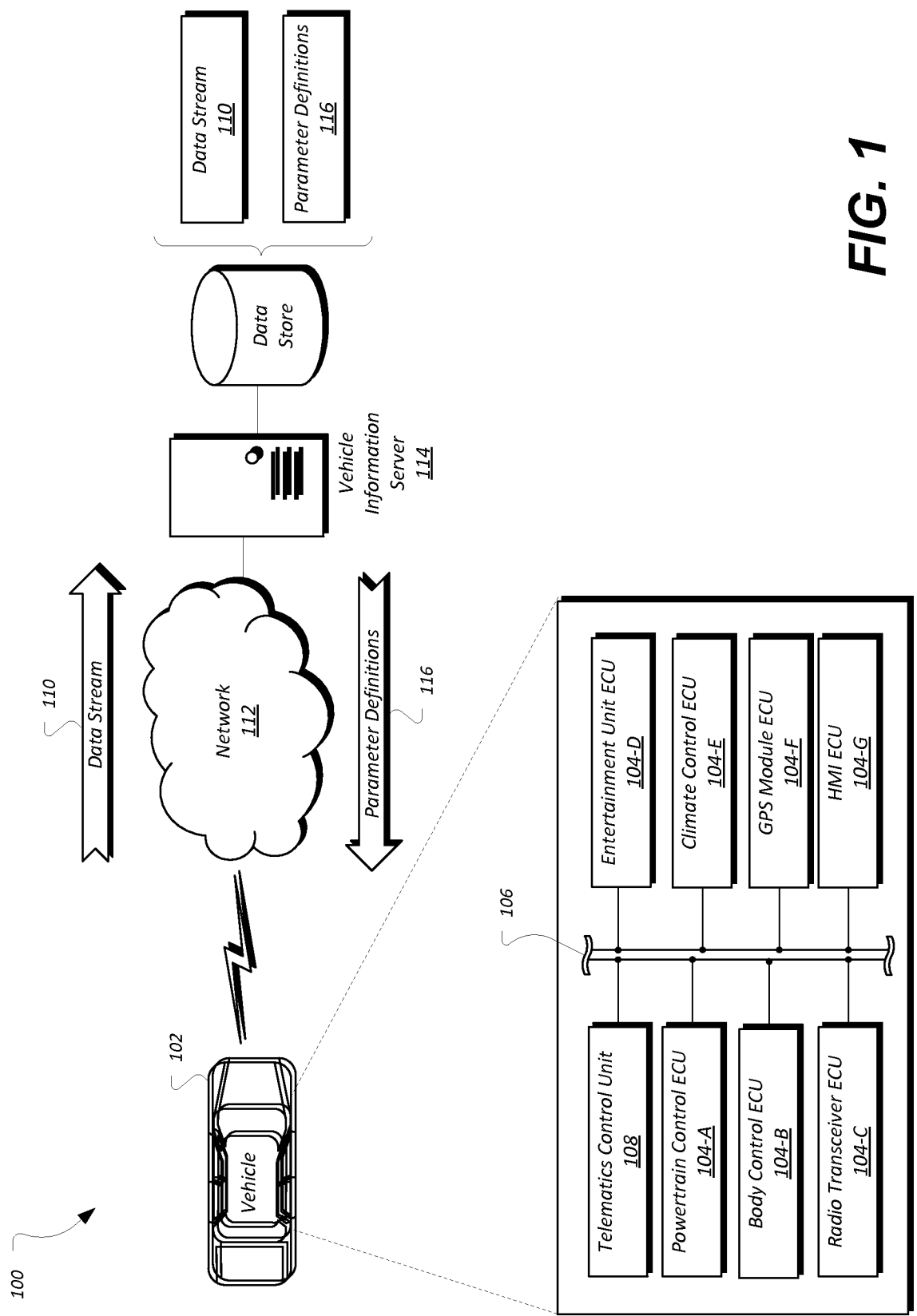
FIG. 1 illustrates an example vehicle implementing telematics data collection features.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicle data reporting architectures, and software/firmware updates of data reporting applications, may be utilized to facilitate efficient, automatic, and reconfigurable vehicle data processing and uploading of data to a vehicle information server. During vehicle operation, a predefined data set of raw ECU parameters may be collected, processed, and stored in memory on each vehicle electronic control unit (ECU). Based on the collected raw parameters, available data sets may be extracted from the ECU memory locations, further processed if necessary by configurable reporting applications executed by the ECU, and forwarded to the vehicle information server as a data stream. Once the processed data stream has been uploaded, it may be saved in a vehicle information database for further analysis. According to the analysis, the vehicle information server may support implementation of a service action, providing of an automatic software update to the vehicle, or providing a request to reconfigure additional data streams from the vehicle to facilitate additional in-depth analysis.

Data reporting from a vehicle may be triggered by events which may be either internal to the vehicle or from an external source such as the vehicle information server. If the trigger event originates external to the vehicle, a unique vehicle identifier (such as a VIN) may be sent from the vehicle to the vehicle information server to retrieve specific information regarding which ECUs and associated software versions are on the vehicle and accordingly which data streams can be provided.

Each ECU may be configured to provide a standard list of raw parameters. A list of these available raw parameters and their associated information may be stored in the vehicle information database. By identifying which ECUs are in the vehicle, the system may be able to identify which raw parameters are available to be processed into data streams to be provided to the vehicle information server. If the requested processed data streams are unavailable, but the raw parameters to produce it are available, the appropriate ECUs may be reflashed or otherwise reprogrammed with updated data reporting applications configured to produce the requested data stream. If a request for data is unsupported by the ECUs of the vehicle (e.g., it requires as an input a raw parameter that is not provided by the ECUs), a request-not-supported message may be returned to the vehicle information server.

The resulting collected data stream may be forwarded to the vehicle information server for analysis. In an example, the processed parameters computed by the reporting applications of the ECUs, along with identifying information and/or timestamps for the processing, may be buffered until requested by a collection trigger. For instance, the processed parameters from each ECU may reside within a dedicated buffer representing an individual data stream.

The vehicle data reporting architectures may include subsystems on the vehicle network configured to process data prior to upload to the vehicle information server. Various vehicle data reporting architectures may be utilized to support the data functionality. An example reporting architecture may be implemented according to a decentralized subsystem approach, in which each ECU has its own, dedicated processing subsystem configured to provide the requested data from the ECU via a separate network node of the ECU. In another example, processed data may instead be sent to the telematics control unit via a separate vehicle bus (not necessarily a controller area network (CAN) bus) to avoid depleting base CAN bus bandwidth. By having separate network nodes or networks to facilitate data reporting, the vehicle data reporting architectures may adopt network and message identifiers which are consistent across vehicle lines without conflicting with other vehicle system operation. In yet another example, a centralized processing location, such as the telematics control unit, can execute processing and buffering of data streams sent from the vehicle ECUs.

Specifically-tailored reporting applications may be utilized to compress vehicle data prior to uploading. For example, a trace of an engine revolutions-per-minute (RPM) raw parameter which streams on a CAN bus can be low-pass filtered and then down-sampled while still retaining most of its information. When received, the original signal may be reconstructed with acceptable error once it has been uploaded. In another example, compression of vehicle data may be achieved with other processing (e.g. Fast Fourier Transforms). Other example algorithms that may be used by reporting applications may include, for instance, linear filtering, subsampling, peak detection, median filtering, min/max values, and matched filtering. Further aspects of the efficient provision of telematics data from vehicles are described in detail below.

FIG. 1 illustrates an example system 100 including a vehicle 102 implementing remote telematics data offload features. As illustrated, the vehicle 102 includes a plurality of vehicle ECUs 104 in communication over one or more vehicle buses 106. The vehicle 102 further includes a telematics control unit 108 configured to receive one or more parameter definitions 116 over a network 112 from a vehicle information server 114, configure the vehicle ECUs 104 to provide the information specified by the parameter definitions 116, collect the information specified by the parameter definitions 116 from the vehicle ECUs 104, and send data streams 110 including the specified information to the vehicle information server 114. It should be noted that the system 100 is merely an example, and other arrangements or combinations of elements may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs.

The vehicle 102 may include a plurality of electronic control units (ECUs) 104 configured to perform and manage various vehicle 102 functions under the power of the vehicle battery and/or drivetrain. As depicted, the example vehicle ECUs 104 are represented as discrete ECUs 104-A through 104-G. However, the vehicle ECUs 104 may share physical hardware, firmware, and/or software, such that the functionality from multiple ECUs 104 may be integrated into a single ECU 104, and that the functionality of various such ECUs 104 may be distributed across a plurality of ECUs 104.

As some non-limiting vehicle ECUs 104 examples: a powertrain control ECU 104-A may be configured to provide control of engine operating components (e.g., idle control components, fuel delivery components, emissions control components, etc.) and for monitoring status of such engine operating components (e.g., status of engine codes); a body control ECU 104-B may be configured to manage various power control functions such as exterior lighting, interior lighting, keyless entry, remote start, and point of access status verification (e.g., closure status of the hood, doors and/or trunk of the vehicle 102); a radio transceiver ECU 104-C may be configured to communicate with key fobs, mobile devices, or other local vehicle 102 devices; an entertainment control unit 104-D may be configured to support voice command and BLUETOOTH interfaces with the driver and driver carry-on devices; a climate control management ECU 104-E may be configured to provide control of heating and cooling system components (e.g., compressor clutch, blower fan, temperature sensors, etc.); a global positioning system (GPS) ECU 104-F may be configured to provide vehicle location information; and a human-machine interface (HMI) ECU 104-G may be configured to receive user input via various buttons or other controls, as well as provide vehicle status information to a driver, such as fuel level info, engine operating temperature information, and current location of the vehicle 102.

The vehicle bus 106 may include various methods of communication available between the vehicle ECUs 104, as well as between the telematics control unit 108 and the vehicle ECUs 104. As some non-limiting examples, the vehicle bus 106 may include one or more of a vehicle controller area network (CAN), an Ethernet network, and a media oriented system transfer (MOST) network. Further aspects of the layout and number of vehicle buses 106 are discussed in further detail below.

The telematics control unit 108 may include network hardware configured to facilitate communication between the vehicle ECUs 104 and with other devices of the system 100. For example, the telematics control unit 108 may include a cellular modem configured to facilitate communication with the communications network 112. The network 112 may include one or more interconnected communication networks such as the Internet, a cable television distribution network, a satellite link network, a local area network, a wide area network, and a telephone network, as some non-limiting examples. As another example, the telematics control unit 108 may utilize one or more of Bluetooth, Wi-Fi, and wired USB network connectivity to facilitate communication with the communications network 112 via the user's mobile device. In an example, the telematics control unit 108 may be programmed to periodically collect information from the ECUs 104, package the information into data streams 110, and provide data streams 110 to the vehicle information server 114 over the communications network 112.

The telematics control unit 108 may be further configured to include one or more interfaces from which vehicle information may be sent and received. In an example, the telematics control unit 108 may be configured to facilitate the collection of vehicle information for inclusion in the data streams 110 from the vehicle ECUs 104 connected to the one or more vehicles buses 106. The vehicle information retrieved by the telematics control unit 108 may include, as some non-limiting examples, accelerator pedal position, steering wheel angle, vehicle speed, vehicle location (e.g., GPS coordinates, etc.), vehicle unique identifier (e.g., VIN), engine revolutions per minute (RPM), and vehicle HMI information, such as steering wheel button press information. Further aspects of the collection of vehicle information from the vehicle ECUs 104 are discussed in detail below.

The vehicle information server 114 may include various types of computing apparatus, such as a computer workstation, a server, a desktop computer, a virtual server instance executed by a mainframe server, or some other computing system and/or device. Computing devices, such as the vehicle information server 114, generally include a memory on which computer-executable instructions may be maintained, where the instructions may be executable by one or more processors of the computing device. Such instructions and other data may be stored using a variety of computer-readable media. A computer-readable medium (also referred to as a processor-readable medium or storage) includes any non-transitory (e. g., tangible) medium that participates in providing data (e.g., instructions) that may be read by a computer (e.g., by the processor of the vehicle information server 114). In general, processors receives instructions, e.g., from the memory via the computer-readable storage medium, etc., and executes these instructions, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Objective C, Fortran, Pascal, Visual Basic, Java Script, Perl, Python, PL/SQL, etc. In an example, the vehicle information server 114 may be configured to maintain the data streams 110 received from the telematics control unit 108 of the vehicles 102 by way of the network 112.

The vehicle information server 114 may be further configured to maintain parameter definitions 116 descriptive of the various elements of the data streams 110 that may be provided by the vehicles 102. The parameter definitions 116 may include a listing of information for each of the possible parameter, such as a global identifier of the particular parameter, a description of the type of data represented by the parameter (e.g., name), an identifier of a ECU 104 configured to provide the parameter, and details of the format of the data of the parameters (e.g., bitrate, scale, accuracy, precision). In some cases, the parameter definitions 116 may also include information regarding algorithms or other processing that may be used to configure the ECUs 104 to process the data streams 110 into the particular parameter definition 116. In an example, the parameter definitions 116 may include software of firmware that may be installed to and executed by the ECUs 104 to cause the ECUs 104 to become reconfigured to provide the particular parameter definition 116.

Variations on the system 100 are possible. In an example, instead of or in addition to use of the telematics control unit 108 to provide remote connectivity to the vehicle information server 114, the telematics control unit 108 may utilize communications features of a modem of a user's mobile device paired with the entertainment using ECU 104-D to perform communication over the communications network 112.

FIG. 2 illustrates an example diagram 200 of a reporting subsystem 202 of the system 100 for one of the ECUs 104 of the vehicle 102. As illustrated, the reporting subsystem 202 includes a reporting application 204 executed by the ECU 104 and in communication with a vehicle data buffer 206 associated with the ECU 104. The ECU 104 may be configured to store the reporting application 204 to a programmable memory of the ECU 104. The ECU 104 may be further configured to be communicatively connected to one or more vehicle buses 106. While the buffer is illustrated as being logically separate from the ECU 104, it should be noted that the buffer 206 may include one or more memories either included within the ECU 104 and/or outside of the ECU 104. The buffer 206 may be further configured to be communicatively connected to one or more vehicle buses 106. Notably, the buffer 206 may not necessarily be connected to the same more vehicle bus 106 to which the ECU 104 is connected.

FIG. 3 illustrates an example diagram 300 of processing of vehicle 102 data by the reporting application 204 of the reporting subsystem 202 of the ECU 104. As shown, raw parameters 302 may be provided by the ECU 104, such as according to the hardware of the ECU 104 and/or according to the firmware programming of the ECU 104. Thus, these raw parameters 302 may be relatively unchangeable by changes to the reporting application 204. Thus, an update to the provisioning of the raw parameters 302 may require a firmware update to the firmware of the ECU 104, not merely an update to the reporting application 204 that is configured to processes the raw parameters 302.

The reporting application 204 may be configured to receive the raw parameters 302 that are available from the ECU 104, and utilize various algorithms or functionality to process the raw parameters 302 into processed parameters 304. For instance, the reporting application 204 may be configured to compress the raw parameters 302 into processed parameters 304 which may include a data-compressed version of aspects of the raw parameters 302. In another example, the reporting application 204 may be configured to filter the raw parameters 302 into processed parameters 304 which include only a subset of the information of the raw parameters 302. Other example processing algorithms may include linear filtering, subsampling, peak detection, FFTs, median filtering, min/max values, and matched filtering. Each processed parameter 304 may be associated with an identifier, such as a unique identifier number of the parameter definition 116 associated with a processed parameter 304 to be provided by the ECU 104. A detailed example of conversion of a raw parameter 302 into a processed parameter 304 is discussed below with respect to FIG. 6.

Once processed, the reporting application 204 may be configured to provide the processed parameters 304 to the buffer 206. The buffer 206 may accordingly be configured to store the processed parameters 304 to be offloaded. In an example, the buffer 206 may store the processed parameters 304 in a structure including an identifier number of the parameter definition 116 identifying the processed parameters 304 being stored, a value of the processed parameter 304, and a timestamp (e.g., a collection time of the raw parameters 302 used to compute the processed parameter 304, of a starting or completion time of computation of the processed parameter 304, etc.). Responsive to triggering of reporting of the processed parameters 304, the buffer 206 may be configured to send a data unit or packet (e.g., a CAN frame) for each ID/value/time structure of each processed parameter 304 collected for the ECU 104. Accordingly, when executed by the ECU 104, the reporting application 204 may be configured to cause the ECU 104 to generate the processed parameters 304 specified by the parameter definitions 116, as well as to pass the processed parameters 304 to the buffer 206 for data collection.

The ECU 104 may be further configured to allow the reporting application 204 to be flashed with an updated reporting application 204, such as responsive to updated parameter definitions 116 received from the vehicle information server 114. In an example, the ECU 104 may be configured to receive the updated reporting application 204 via one or more vehicle bus 106 of the vehicle 102. The reporting application 204 may reside in a dedicated software location of the ECU 104, such that the reporting application 204 may be updated efficiently by a differential update, without affecting the other programming of the ECU 104.

Figure 4:
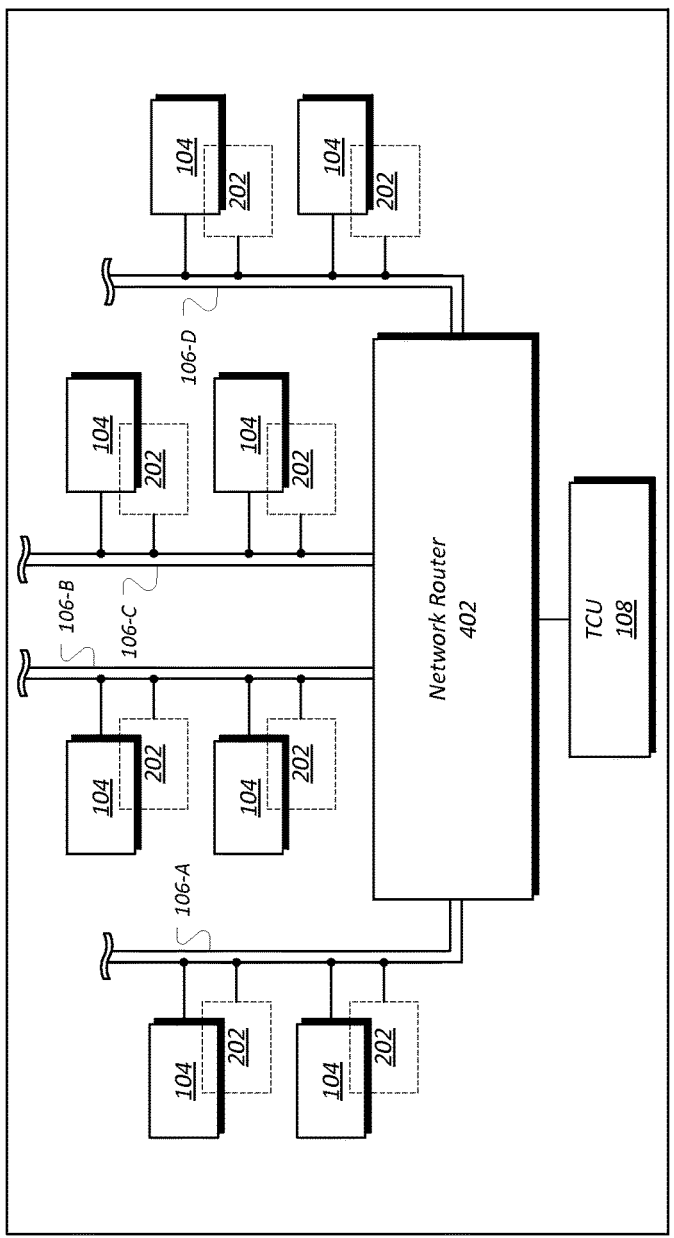
FIG. 4 illustrates an example diagram of a network architecture for the vehicle including data reporting subsystems utilizing the same vehicle networks as utilized by the electronic control units.

FIG. 4 illustrates an example diagram of a network architecture 400 for the vehicle 102. In the example network architecture 400, the data reporting subsystems 202 utilize the same vehicle networks 106 as utilized by the ECUs 104 for ECU-to-ECU communication. In the illustrated network architecture 400, each reporting subsystem 202 is illustrated as being connected to the same vehicle bus 106 (e.g., CAN bus) as its associated ECU 104.

The network architecture 400 also includes a network router 402 configured to bridge the vehicle buses 106 to facilitate communications between the reporting subsystems 202 of the ECUs 104 and the telematics control unit 108. For example, the network router 402 may be configured to identify which vehicle bus 106 is connected to a destination of a received message, and forward the received message onto the appropriate vehicle bus 106. Using the network architecture, the telematics control unit 108 may be configured to request the data reporting subsystems 202 of the vehicle ECUs 104 to provide the packaged vehicle data 306 to the telematics control unit 108. The telematics control unit 108 may accordingly collect the packaged vehicle data 306 into data streams 110, and provide the data streams 110 to the vehicle information server 114.

Figure 5:
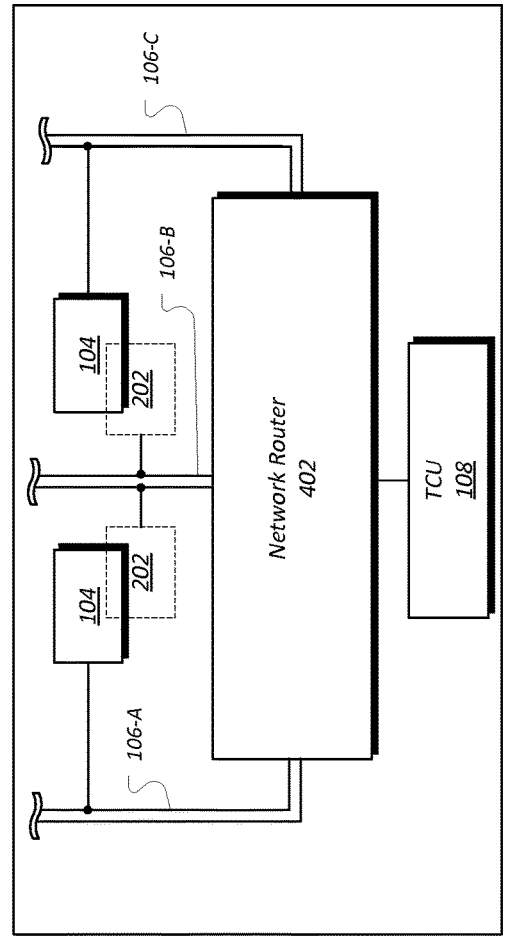
FIG. 5 illustrates an example diagram of a network architecture for the vehicle including data reporting subsystems utilizing a separate reporting vehicle network from the vehicle networks utilized by the electronic control units.

FIG. 5 illustrates an alternate example diagram of a network architecture 500 for the vehicle 102 utilizing a separate reporting vehicle bus 106 from the vehicle bus 106 utilized by the ECUs 104. As compared to the network architecture 400, in the network architecture 500 the reporting data traffic is not provided across the same vehicle bus 106 as utilized for ECU-to-ECU communication. By utilizing a separate vehicle bus 106 for the reporting subsystems 202, the network architecture 500 may alleviate concerns with additional bandwidth usage required to support additional data transmission within the vehicle 102 to provide for telematics control unit 108 collection of the packaged vehicle data 306 for reporting into data streams 110.

Figure 6:
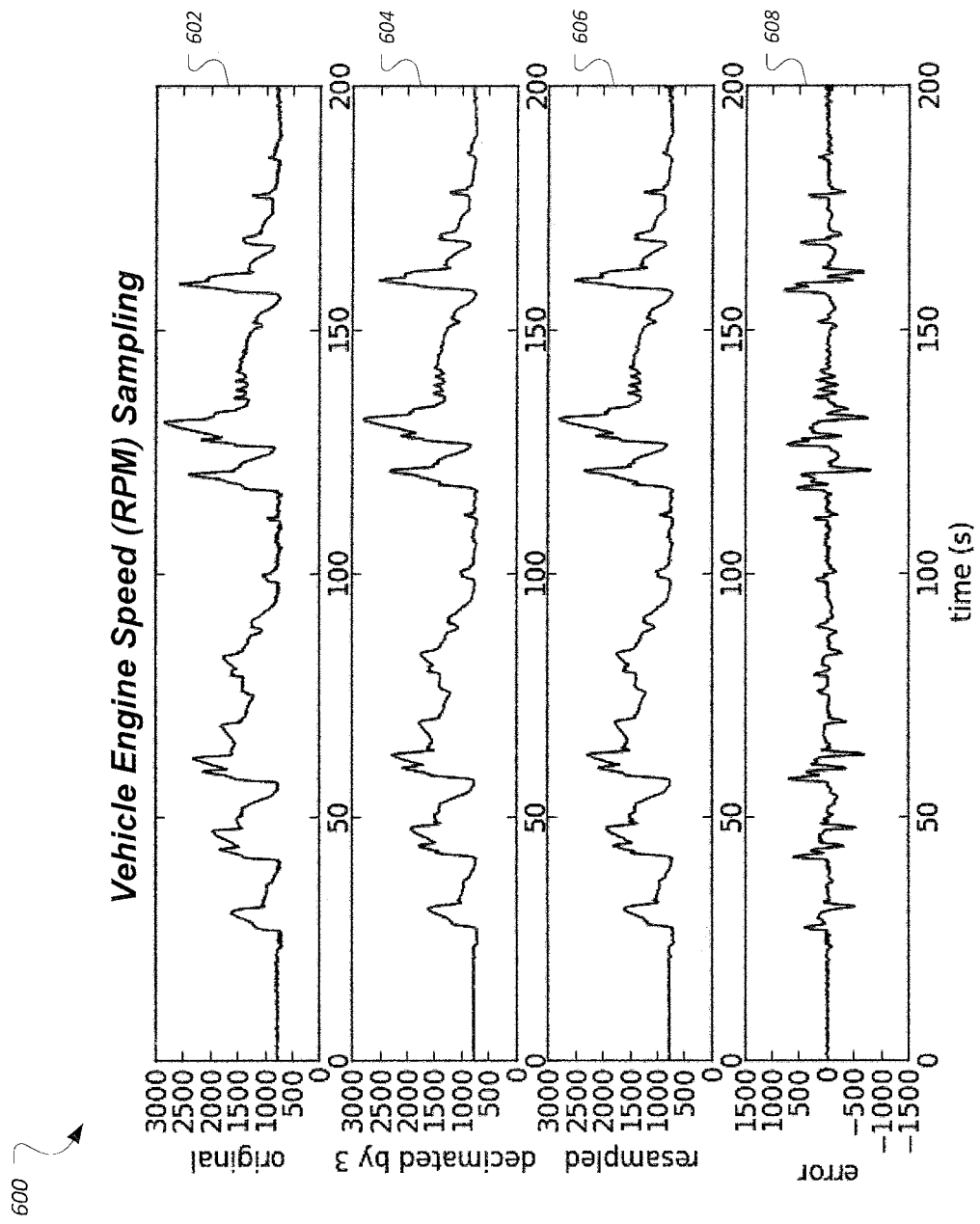
FIG. 6 illustrates an example of a reporting application compressing raw parameters into processed parameters for reporting.

FIG. 6 illustrates an example 600 of a reporting application 204 compressing raw parameters 302 into processed parameters 304 for reporting. In the illustrated example 600, a data stream 602 of engine revolutions per minute (RPM) is shown as an original raw parameter 302 provided by an engine controller ECU 104, a reduced data stream 604, a resampled data stream 606 version of the reduced data stream 604, and an error data stream 608 illustrating the difference between the resampled data stream 606 and the original data stream 602. As one possibility, the engine controller ECU 104 may be configured with a reporting application 204 configured to perform the illustrated compression to convert the engine RPM raw parameter 302 (i.e., original data stream 602) into the processed engine RPM parameter 304 (i.e., reduced data steam 604). The reporting application 204 or the ECU 104 may be further configured to store the reduced data stream 604 in the vehicle data buffer 206 for transmission via the vehicle bus 106 to the telematics control unit 108, and offloading from the vehicle 102 to the vehicle information server 114.

As illustrated, the reduced data stream 604 is decimated by a factor of three. Decimation generally refers to a process of reducing a sampling rate of a data stream, in which the data stream may be low-pass filtered and then samples from the data stream may be discarded. The decimation factor may refer to the ratio of the input rate to the output rate, where the decimation factor M is defined such that input rate/output rate=M. Accordingly, the reduced data stream 604 may include one sample for every third sample of the original data stream 602.

The resampled data stream 606 may include the data of the reduced data stream 604 resampled back up to the rate of the original data stream 606. However, as some information was lost due to the lossy compression (i.e., decimation) performed to reduce the amount of data of the original data stream 602 into the reduced data stream 604, there may be some level of error in the resampled data stream 606. The error data stream 608 accordingly illustrates this amount of lost information. Notably, the amount of error in the illustrated example 600 may be acceptably low for many reporting and diagnostic purposes, while conserving vehicle 102 and network bandwidth in the data transmission.

Figure 7:
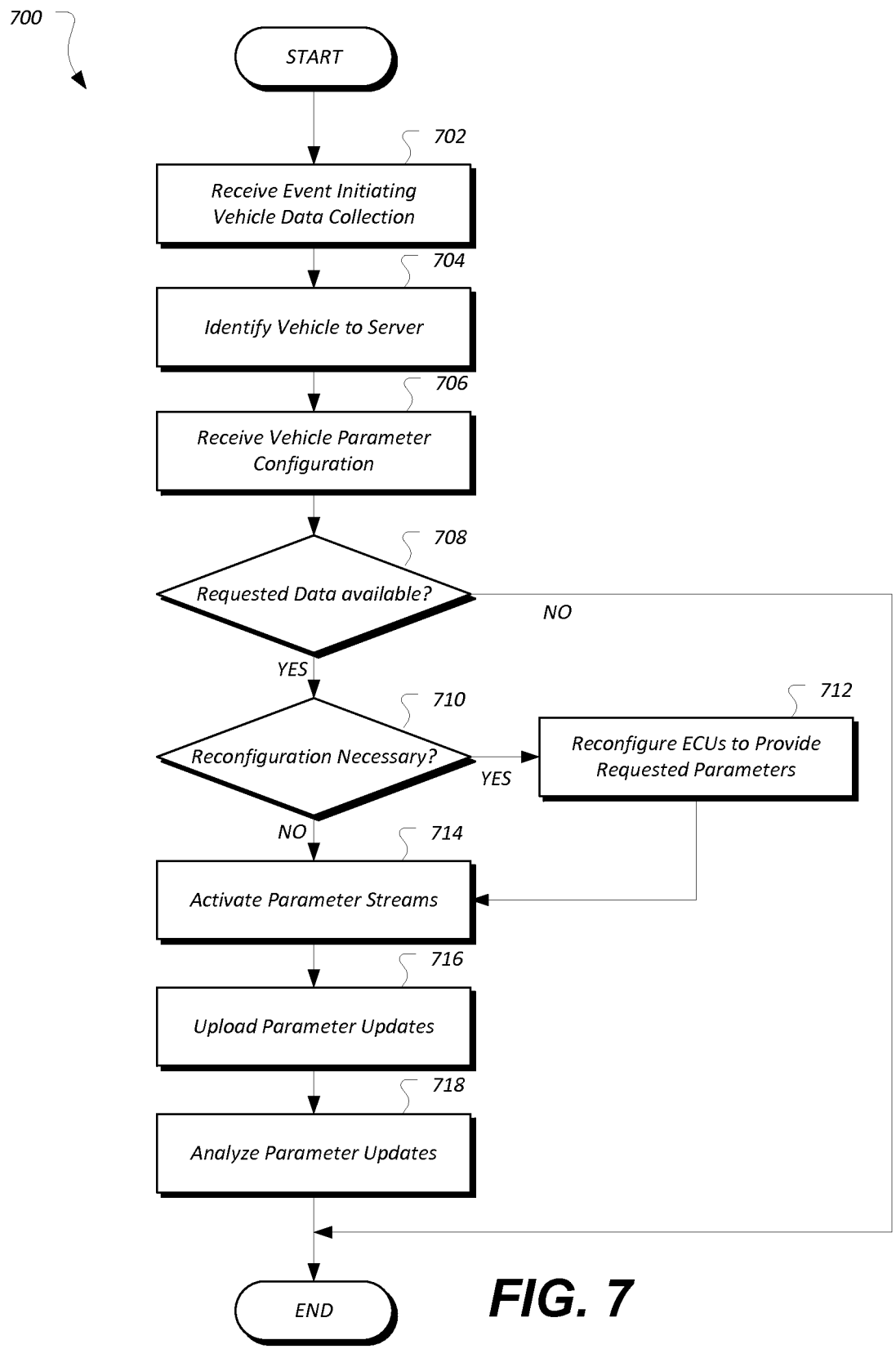
FIG. 7 illustrates an example flow diagram for facilitating efficient, automatic, reconfigurable vehicle data processing and uploading.

FIG. 7 illustrates an example process 700 for facilitating efficient, automatic, reconfigurable vehicle data processing and uploading. The process 700 may be performed, for example, by the vehicle 102 in communication with the vehicle information server 114 over the network 112. The process 700 may be initiated by various events which may be internal to the vehicle 102 or received by the vehicle 102 from an external source.

At operation 702, the vehicle 102 receives an indication of triggering of an event external to the vehicle 102. In an example, the vehicle 102 may receive a reporting request from the vehicle information server 114 requesting that the vehicle 102 provide data streams 110 including information specified by the parameter definitions 116 indicated by the reporting request. In another example, the vehicle 102 may receive a reporting request from a vehicle 102 occupant requesting that the vehicle 102 provide certain information from the vehicles ECUs 104 as indicated by the request. In yet another example, the vehicle 102 may detect occurrence of an event, responsive to which the vehicles 102 should provide certain parameter definitions 116 indicated by the generated event.

At operation 704, the vehicle 102 provides a vehicle 102 identifier in response to the event. In an example, the vehicle 102 may send a VIN of the vehicle 102 to the vehicle information server 114 to request the vehicle information server 114 to provide parameter definitions 116 for reporting for the vehicle 102. Based on the received vehicle 102 identifier, the vehicle information server 114 may be configured to identify the parameter definitions 116 compatible with the ECUs installed to the vehicle 102.

At operation 706, the vehicle 102 receives parameter definition 116 from the vehicle information server 114. For example, based on the determination of compatible parameter definitions 116, the vehicle information server 114 may identify one or more parameter definition 116 to provide to the vehicle 102. In an example, the parameter definition 116 from the vehicle information server 114 may describe the processed parameters 304 to be provided by the vehicle 102 as a unique identifier of the processed parameters 304. In another example, the parameter definition 116 from the vehicle information server 114 may describe the processed parameters 304 to be provided by the vehicle 102 as a reporting application 204 to be installed to a vehicle ECU 102 to receive raw parameters 302 and compute the processed parameters 304.

At operation 708, the vehicle 102 determines whether the requested data is available. In an example, the telematics control unit 108 of the vehicle 102 may query the ECUs 104 to determine whether the ECUs 104 of the vehicle 102 are capable of providing the raw parameters 302 required to produce the processed parameters 304. If the ECUs 104 report that the raw parameters 302 are unavailable to be provided by the installed vehicle 102 ECUs 104, the process 700 ends. Otherwise, control passes to operation 710.

At operation 710 the vehicle 102 determines whether reconfiguration is necessary to provide the requested data. In an example, the telematics control unit 108 of the vehicle 102 may query the ECUs 104 to determine whether the ECUs 104 are configured to process the raw parameters 302 into the processed parameters 304 specified by the parameter definitions 116. If one or more ECUs require reconfiguration, control passes to operation 712. Otherwise, if the ECUs 104 are properly configured, control passes to operation 714.

At operation 712, the vehicle 102 reconfigures the data streams 110. In an example, the telematics control unit 108 may request the out-of-date ECUs 104 to update their reporting applications 204 to process the raw parameters 302 into the processed parameters 304 in accordance with one or more reporting applications 204 included within or otherwise specified by the parameter definitions 116.

At operation 714, the vehicle 102 activates the data streams 110. In an example, the ECUs 104 may utilize their respective reporting applications 204 to process the raw parameters 302 into the processed parameters 304. The reporting applications 204 may accordingly provide the processed parameters 304 to the vehicle data buffers 206 associated with the ECUs 104.

At operation 716, the vehicle 102 uploads the data. In an example, the telematics control unit 108 may be programmed to periodically collect the packaged vehicle data 306 from the vehicle data buffers 206 associated with the ECUs 104, and provide the data as data streams 110 to the vehicle information server 114 over the communications network 112.

At operation 718, the vehicle information server 114 analyzes the data. For example, the vehicle information server 114 may support querying of the maintained data streams 110 to provide data processing and other features to users of the vehicle information server 114. After operation 718, the process 700 ends.

Figure 8:
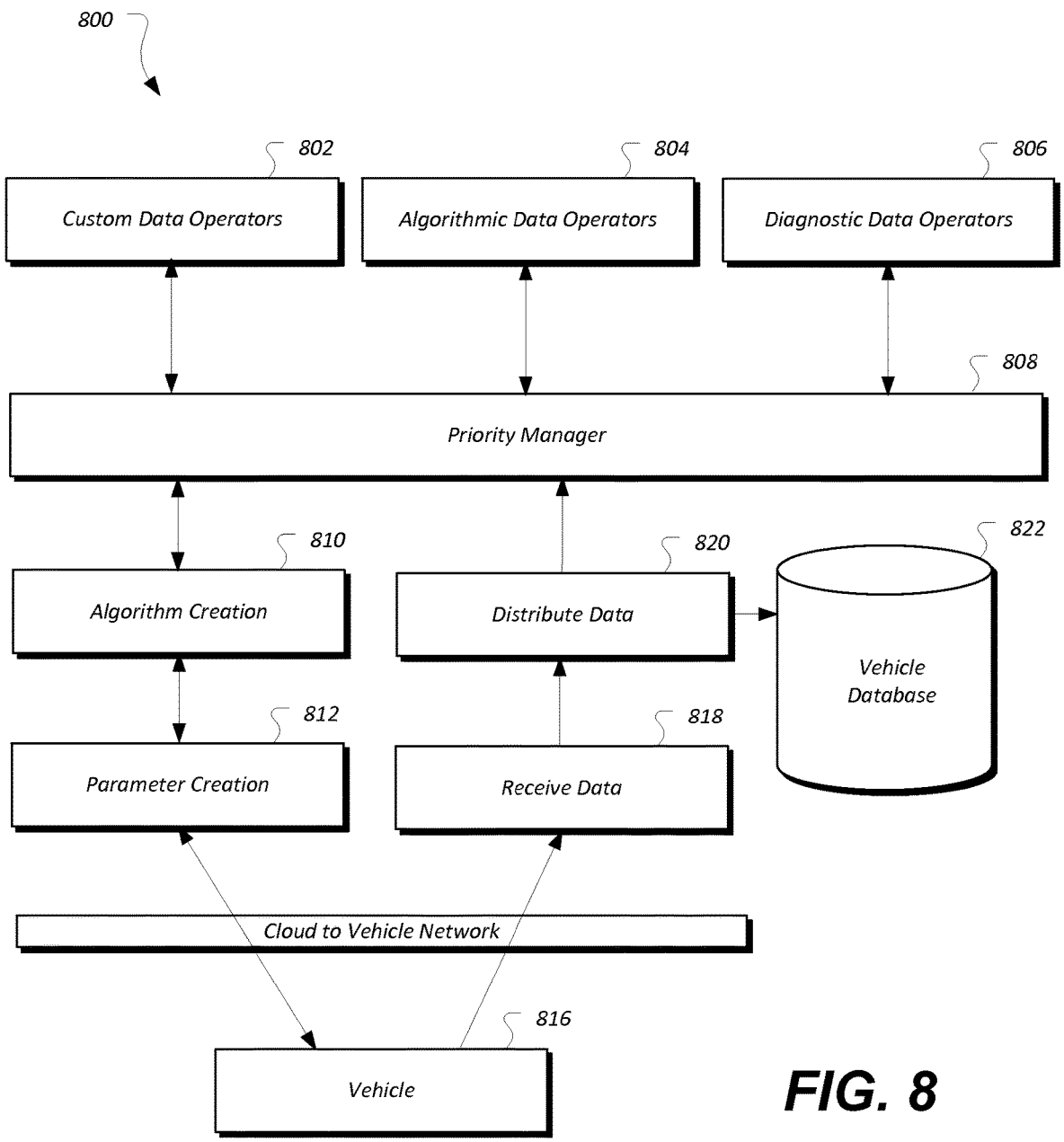
FIG. 8 illustrates an example vehicle information server implementing telematics data collection features with a vehicle.

FIG. 8 illustrates an example process 800 for facilitating efficient, automatic, reconfigurable server based vehicle data processing and gathering of data from a vehicle 102. The process 800 may be performed, for example, by the vehicle information server 114 in communication with the vehicle 102 over the network 112. The process 800 may be initiated by various events which may be internal to the server 114 or received by the server 114 from an external source. Data operators define the parameters to be captured by the vehicle. Here, 3 data operators are shown, custom data operators 802, algorithmic data operators 804, and diagnostic data operators 806. The custom data operators 802 are typically for specific analysis of a vehicle that exhibits a type of operation or produces a specific flag, diagnostic trouble code (DTC), notification, or warning. The specific analysis may be attributed to an engineering need. The vehicle may be a single identifiable vehicle, vehicle line, class of vehicles, or group of vehicles containing a specific vehicle option. For example, a custom data operator may be for all vehicles that have a specific model Sync system, or a body control module (BCM) manufactured by a specific Tier 1 supplier. Also, the custom data operator 802 may be conditioned upon a number of occurrences of the flag or DTC being greater than a predetermined threshold. For example, an occurrence of an exhaust gas recirculation (EGR) DTC exceeds a threshold, then request parameters such as engine RPM, ambient air temp, and engine air temp.

The algorithmic data operators 804 are typically for usage of a vehicle. The vehicle may be a single identifiable vehicle, vehicle line, class of vehicles, or group of vehicles containing a specific vehicle option. The usage may be helpful in determining adoption rates, usage patterns, customer demands, and business aspects associated with the feature. For example, the vehicle may be a new vehicle line, and the VIN associated with the first 1,000 vehicles may be selected in which a specific parameter is monitored for 6 months and after the 6 months, the parameter is monitoring is turned off. The parameter may include use of certain features such as automatic park assistance, infotainment usage, ambient light selection and usage, 4 wheel drive usage, etc.

The diagnostic data operators 806 are typically for operation of a vehicle. The vehicle may be a single identifiable vehicle, vehicle line, class of vehicles, or group of vehicles containing a specific vehicle option. The operation of the vehicle may be attributed to warranty information. For example, the vehicle may be a new vehicle line, and the VIN associated with the first 1,000 vehicles may be selected in which a specific parameter is monitored for 6 months and after the 6 months, the parameter is monitoring is turned off. The parameter may include a histogram of engine RPM, fuel consumption, engine temperature, acceleration rate, driver power demand, etc.

At operation 808, the server 114 prioritizes the data operators (802, 804, and 806). The prioritization may be based on a flag, a semaphore, prioritization structure, or module specific limitation. The priority structure may include a simple 3 level (High, Medium, Low) in which each data operator is assigned a level and multiple operators a level are determined via a first in first out (FIFO), numerical identification within the level, or may be a complex combination using multiple prioritization methods. fuzzy logic based system in which individual data operators may be assigned a weight along with a class The module specific limitation may include a non-atomic limitation of a CPU of the module with respect to processing multiple data operators concurrently.

At operation 810, the server 114, based on identified parameters from the priority manager 808, generates the algorithms to capture, aggregate and transmit the parameters. Here, some of the parameters may be captured at a fast rate such as 100 μsec, and then aggregated to form a histogram such that data based on 100 μsec resolution is able to be transmitted to and analyzed by the server without creating a bottle neck from the amount of data based on the sample rate.

At operation 812, the server 114 generates the parameters for each identified module in the vehicle using a holistic approach. Here, the server 114 generates the definition parameters for each module considering all parameters, algorithms, and modules identified in the algorithm creation block 810. However, before the defined parameters are finalized, the server 114 communicates with the vehicle 816 via the cloud to obtain data on internal bus bandwidth of the vehicle, status of the vehicle and transfer rate of the connection between the vehicle or an individual module and the server. One data path from the vehicle 816 to the server 114 is shown as the bi-directional lines between the priority manager 808, algorithm creation 810, parameter creation 812, and the vehicle 816. This group of bi-directional lines and modules (808, 810, 812, and 816) are typically used to set-up the vehicle 816 to capture, aggregate, and packetize data. Once the parameter definition is loaded to the vehicle 816, The vehicle 816 may capture, aggregate, packetize, and transmit the data to the server 114.

The vehicle 816 such as the vehicle 102 with modules 104 and 108 and a vehicle bus 106, may also include modules such as an anti-lock brake system (ABS), electronic stability control (ESC) module, passenger occupant detection system (PODS), and restraint control module (RCM). These modules may be capable of gathering many aspects of vehicle operation and usage. For example, the ABS module may be capable of determining a level of a brake pad, a level of brake fluid, and an amount of wheel locking. Based on the level of the brake pad, the ABS module may be able to determine a rate of brake pad wear and based on a selected parameter definition, determine the impact of driving characteristics with brake pad wear. Also, an RCM can determine how often a passenger wears a seat belt, or a PODS can determine how often a passenger is in the vehicle along with characteristics of the passenger such as a weight of the passenger. Further, data traffic on a vehicle bus may be monitored and a parameter definition may configure some modules on a bus to reduce bus traffic in order to 'free-up' or increase available vehicle bandwidth of the bus to meet a data demand of another module requested by the server 114. With an increase in available vehicle bandwidth, the parameter definition may also reconfigure the TCU 108 to increase a connection bandwidth. This may require the TCU to select an alternative channel to operate on such as reconfiguring the TCU from a packetized data over voice to a dedicated data channel such as LTE or 4G LTE.

The data bus of the vehicle 816 may include a controller area network (CAN) bus, a Flexray bus, a Local Interconnect Network (LIN) bus, an Ethernet bus, media oriented systems transport (MOST), and derivatives of these buses such as Ethernet AVB and CAN-FD. Some modules are capable of communicating with other modules using multiple bus protocols. For example, two modules capable of communicating via a CAN-FD protocol may be configured to typically communicate over standard CAN. Here, the modules may be reconfigured to communicate over CAN-FD to provide additional bandwidth associated with the larger payload of the CAN-FD protocol. Also, the transfer rate some modules may be capable of operating at faster rates than they typically communicate at. For example, a bus that is typically configured to operate at 500 kbps may be capable of operating at 1 Mbps. Here, reconfiguring multiple modules to operate for a limited time at the higher 1 Mbps would increase available bandwidth.

At operation 818, the server 114 will receive and parse the data. The data is parsed such that data is categorized and arranged in 'silos' or 'buckets'. The categorization may be based on the vehicle, vehicle line, class of vehicles, or group of vehicles containing a specific vehicle option. Also, the categorization may be based on the DTC, nature of the parameter, value of the parameter, or data associated with a vehicle exhibiting a specific operation characteristic. For example, if a vehicle is being analyzed regarding a complaint of lack of acceleration, data from multiple modules such as a power train control module (PCM), transmission control module (TCM), anti-lock brake system (ABS), tire pressure monitoring system (TPMS), etc. An example of data from a PCM may include engine RPM, fuel flow, fuel consumption, air temperature, coolant temperature, oil pressure, oil temperature, exhaust temperature, exhaust oxygen concentration, and air intake oxygen concentration. At operation 820, the server 114 parses the data such that it is arranged for storage in a vehicle databased 822, displayed on a monitor, or utilized with other data for analysis.

Figure 9:
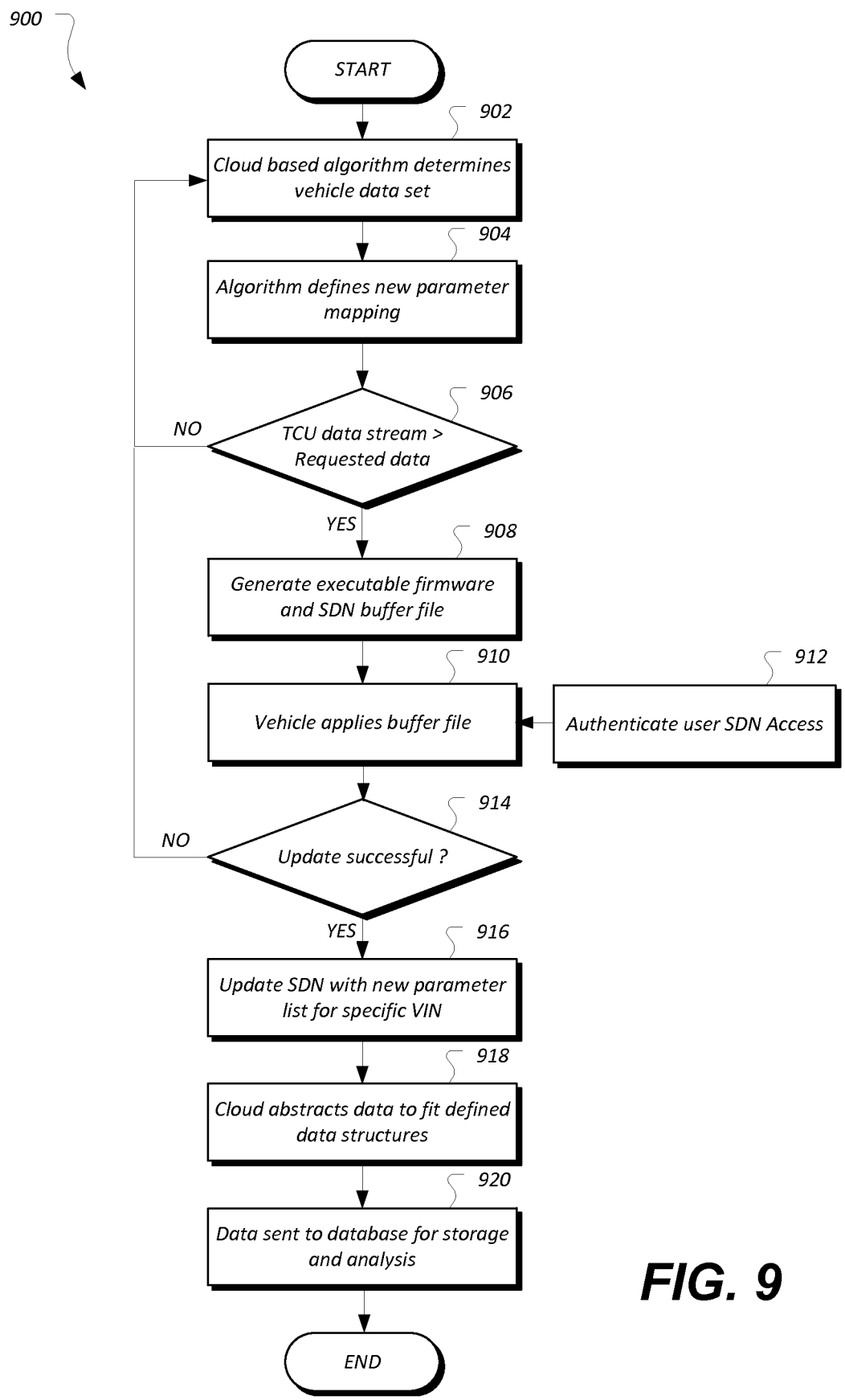
FIG. 9 illustrates an example flow diagram for facilitating efficient, automatic, reconfigurable vehicle level data processing by a server.

FIG. 9 illustrates an exemplary flow diagram 900 for facilitating efficient, automatic, reconfigurable vehicle level data processing by a server such as server 114. The flow diagram 900 may be implemented in the block diagram 800.

At operation 902, the server 114 determines a vehicle data set. In one implementation, operation 902 may be implemented by block 810 of FIG. 8. In an alternative embodiment, the operation 902 may be defined by abstracted variables on a client. At operation 904, the server defines the mapping of parameter such as shown in block 812 of FIG. 8. Based on the parameter mapping of operation 902, the server 114 compares the available TCU data stream with the requested data stream at operation 906. If the available data stream is less than the requested data stream, the decision tree will branch back to operation 902 to determine another vehicle data set. If the available data stream is greater than the requested data stream, the decision tree will continue to operation 908. In an alternative embodiment, operation 904 may update a Message Queuing Telemetry Transport (MQTT) topic with a protocol buffer format such as a Google protocol buffer format.

At operation 908, the server 114 generates the parameter definition that may include executable firmware, reporting code, or a buffer file such as a Service Delivery Network (SDN) buffer file. This is similar to the combination of steps 810, and 812 of FIG. 8 after the verification of the available data stream. The firmware and reporting code may include assembly instruction for the processor or controller of the module, calibration variables to configure the processor or controller to perform the task or to run libraries, or instructions to run on a virtual machine created by the processor or controller.

At operation 910, the server 114 transmits the parameter definition to the vehicle via the cloud or other network. At the remote vehicle 816 authentication of the access to the vehicle 816 is requested. At operation 912 authentication may be requested via a pop-up menu on an driver information console (DIC), infotainment screen, or instrument panel display. Authentication may be required to proceed further or in an alternative embodiment, authentication may be required to block or turn off access to the vehicle 816. Access may be granted either expressly or implied by lack of blocking access. A module or multiple modules in the vehicle are updated with the parameter definition after access is granted. The updates may include erasing and reprogramming non-volatile memory such as EEPROM, FLASH or MRAM memory or volatile memory such as RAM. Verification of a proper update is performed at operation 914.

At operation 916, the server updates the server buffer file for the specific VIN. This may include a handshake between blocks 812 and 816 to configure the module based on data from the vehicle 816. At operation 918, the server 114 via the cloud abstracts data to parse the data into data structures. The data is then sent to a database for storage and analysis at operation 920.

The processes, methods, or algorithms disclosed herein may be deliverable to or implemented by a processing device, controller, microcontroller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
a processor configured to, responsive to receiving a VIN from a remote vehicle and data about an internal bandwidth of a bus of the vehicle and a transfer rate of a connection between the vehicle and processor, transmit to the vehicle a parameter definition selected based on fields of the VIN, the internal bandwidth, and the transfer rate, wherein the parameter definition is configured to prompt
a telematics control unit of the vehicle to select an alternative channel to operate on to increase available bandwidth of the connection between the vehicle and processor, and
an ECU of the vehicle to enter a logging mode to capture operational data of the vehicle, to decimate the operational data to generate compressed operational data and conserve the internal bandwidth of the bus of the vehicle, and send the compressed operational data to the processor via the connection between the vehicle and processor.

2. The system of claim 1, wherein the parameter definition includes a reporting application configured to be executed by a processor of the ECU to generate a processed parameter from a raw parameter associated with vehicle operation.

3. The system of claim 2, wherein the parameter definition includes updated firmware for the ECU, and the reporting application is configured to be executed by the ECU after the updated firmware is installed in the ECU.

4. The system of claim 2, wherein the parameter definition includes a unique identifier of the processed parameter.

5. The system of claim 1, wherein the processor is configured to, in response to receiving the operational data from the vehicle, transmit to the vehicle an updated parameter definition selected based on the fields and operational data to reconfigure the ECU to exit the logging mode.

6. The system of claim 1, wherein the processor is further configured to receive from the vehicle after a delay after transmission of the parameter definition, a data stream from the vehicle indicative of operation of the vehicle configured with the parameter definition, and transmit to the vehicle a new parameter file for a different ECU based on the data stream.

* * * * *